United States Patent
Arimura et al.

(10) Patent No.: US 8,396,125 B2
(45) Date of Patent: Mar. 12, 2013

(54) PICTURE CODING APPARATUS AND PICTURE CODING METHOD

(75) Inventors: Koji Arimura, Osaka (JP); Yuki Maruyama, Osaka (JP); Hideyuki Ohgose, Osaka (JP)

(73) Assignee: Panasonic Corporation, Osaka (JP)

( * ) Notice: Subject to any disclaimer, the term of this patent is extended or adjusted under 35 U.S.C. 154(b) by 980 days.

(21) Appl. No.: 12/252,593

(22) Filed: Oct. 16, 2008

(65) Prior Publication Data

US 2009/0103618 A1    Apr. 23, 2009

(30) Foreign Application Priority Data

Oct. 17, 2007    (JP) .................... 2007-270739

(51) Int. Cl.
    *H04N 7/00*    (2006.01)
(52) U.S. Cl. .......... 375/240.13; 375/240.14; 375/240.24
(58) Field of Classification Search .......... 375/240.13, 375/240.14, 240.24
    See application file for complete search history.

(56) References Cited

U.S. PATENT DOCUMENTS

| | | | | |
|---|---|---|---|---|
| 5,694,171 | A * | 12/1997 | Katto | 375/240.03 |
| 6,295,375 | B1 * | 9/2001 | Andry | 382/232 |
| 6,415,055 | B1 * | 7/2002 | Kato | 382/236 |
| 6,591,015 | B1 * | 7/2003 | Yasunari et al. | 382/236 |
| 6,760,292 | B1 * | 7/2004 | Sugahara | 369/53.31 |
| 7,933,335 | B2 * | 4/2011 | Ikeda et al. | 375/240.16 |
| 2005/0117644 | A1 * | 6/2005 | Ducloux et al. | 375/240.12 |
| 2005/0231635 | A1 * | 10/2005 | Lin | 348/441 |
| 2005/0254010 | A1 * | 11/2005 | Kato et al. | 352/59 |
| 2006/0008007 | A1 * | 1/2006 | Olivier et al. | 375/240.16 |
| 2006/0120453 | A1 * | 6/2006 | Ikeda et al. | 375/240.16 |
| 2006/0150233 | A1 * | 7/2006 | LeComte et al. | 725/135 |
| 2006/0164328 | A1 * | 7/2006 | Jaff | 345/2.3 |
| 2007/0104276 | A1 * | 5/2007 | Ha | 375/240.16 |
| 2008/0040639 | A1 * | 2/2008 | Kang | 714/738 |
| 2008/0112486 | A1 * | 5/2008 | Takahashi et al. | 375/240.12 |
| 2009/0122864 | A1 * | 5/2009 | Palfner et al. | 375/240.12 |

FOREIGN PATENT DOCUMENTS

| | | |
|---|---|---|
| EP | 1 933 570 | 6/2008 |
| JP | 2006-186979 | 7/2006 |
| WO | 2007/040197 | 4/2007 |

OTHER PUBLICATIONS

MPEG-2, H.264 (MPEG-4 AVC), "Advanced video coding for generic audiovisual services," Series H: Audiovisual and Multimedia Systems, pp. i-xiv and 1-324, Mar. 2005.

* cited by examiner

*Primary Examiner* — Beemnet Dada
*Assistant Examiner* — Sayed Beheshti Shirazi
(74) *Attorney, Agent, or Firm* — Wenderoth, Lind & Ponack, L.L.P.

(57) ABSTRACT

A picture coding apparatus includes a picture feature amount extracting unit which extracts respective feature amounts of the current picture and a picture having a specific relationship with the current picture; a correlation degree calculating unit which calculates, based on the feature amount extracted by the feature amount extracting unit, a correlation degree indicating a degree of image similarity between the current picture and the picture having a specific relationship with the current picture; a picture type determining unit which determines, depending on the calculated correlation degree, a picture type for the current picture, from two picture types on which different inter-picture prediction is performed; and a coding unit which codes the current picture according to the determined picture type.

8 Claims, 10 Drawing Sheets

Display order

Display order

Display order

Display order

Display order

Display order

Coding efficiency for third frame
Br-Br structure<Br-B structure (a)

(b)

Coding efficiency for third frame
Br-Br structure<Br-B structure (a)

(b)

PICTURE CODING APPARATUS AND PICTURE CODING METHOD

BACKGROUND OF THE INVENTION (1) Field of the Invention

The present invention relates to picture coding apparatuses and picture coding methods, and particularly to a picture coding apparatus and a picture coding method for decoding a coded picture stream coded by predictive coding, and re-coding the decoded picture data using a predetermined predictive coding method.

(2) Description of the Related Art

In recent years, the digitalization of AV information is advancing, and the devices that can handle picture signals by digitalization are becoming widely popular. Since the amount of information included in a picture signal is large, it is common practice to perform coding while reducing the amount of information, in consideration of recording capacity and transmission efficiency. As coding techniques for picture signals, international standards such as MPEG-2 and H.264 (MPEG-4 AVC) are established.

In these standards, a picture is coded using an I-picture on which intra-picture prediction is used without performing prediction on the time axis, a P-picture that allows prediction from one reference picture on the time axis, and a B picture that allows prediction from an interpolated picture of two pictures on the time axis. An interpolated picture can be obtained by calculating an average of pixel values of a predetermined area of two reference pictures. It should be noted that, hereinafter, both a frame in the progressive method of coding and a field in the interlaced method of coding shall be shall be generically called a "picture".

In H.264, the B-picture which was not previously used as a reference picture, can be assumed as a picture that can be referred to (Br-picture), thus realizing an improvement in coding efficiency.

FIG. 1 is a diagram showing an example of the reference relationship of B-pictures in the case where Br-pictures are not used in coding according to the progressive method. Furthermore, FIG. 2 is a diagram showing an example of the reference relationship of B pictures in the case where Br-pictures are used in coding according to the progressive method. In MPEG-1 and MPEG-2, Br-pictures do not exist and only the reference relation in FIG. 1 is considered. As shown in FIG. 1, in the case where Br-pictures are not used, a B picture refers to only a preceding and following P-picture (or a preceding and following I-picture and P-picture). However, in the case where Br-pictures can be used, as shown in FIG. 2, a B picture can refer to two the P-pictures (or I-picture and P-picture) preceding and following it, and to the Br-picture.

Although H.264 allows the selection of a reference picture with which coding efficiency is higher, since Br-pictures can be used, managing the reference picture memory and the process of selecting a reference picture that allows highly efficient coding is complex. Conventionally, an example in which the display order is P→Br→Br→P, and an example in which the display order is P→Br→B→P are given as examples of picture types in the case of using Br-pictures. Hereinafter, the case of coding so that the display order becomes P→Br→Br→P in the field picture structure shall be described. FIG. 3 is a diagram showing an example of the reference relationship in the case of coding in the field picture structure so that the display order becomes P→Br→Br→P. In a case such as this where Br-pictures can be used, the reference relationship becomes complex since each picture can use several pictures as a reference picture, unlike in the conventional case. For example, the Br-picture which is the first field of the third frame can refer to the field pair in the first P-frame, the field pair in the second Br-frame, and the field pair in the fourth P-frame. Specifically, the Br-picture which is the first field of the third frame can select, on a macroblock basis, the reference picture with which coding efficiency will be highest, from among the six fields. Furthermore, the Br-picture which is the second field of the third frame can refer to the first field of the third Br-frame, in addition to the field pair in the first P-frame, the field pair in the second Br-frame, and the field pair in the fourth P-frame. Therefore, this means that the Br-picture which is the second field of the third frame is able to select, on a macroblock basis, the reference picture with which coding efficiency will be highest, from among seven fields. For this reason, although the encoder or decoder is able to generate a moving picture coded stream of high picture quality with a small coding amount, since all the pictures that may possibly be referred to need to be stored in the reference picture memory, there is the problem that, over and above the need for a reference picture memory with a large storage capacity, memory management for the reference picture memory becomes complex.

As such, by placing a constraint on reference relationships, it is possible to facilitate the memory management and configuration of the encoder or decoder, and obtaining coded stream compatibility becomes easy.

For example, it is possible to place the following constraint so as to reduce the number of fields that can be referred to: "In the case of the progressive method, a Br-picture can refer to the I-frame or P-frame located nearest in a forward or backward direction in reproduction order. In the case of the interlaced method, a Br-picture can only refer to the field pair included in the nearest I-frame or P-frame located forward and backward in reproduction order, as well as only the other Br-picture of the field pair in the same Br-frame; and cannot refer to the other Br-pictures". FIG. 4 is a diagram showing an example of the reference relationship of a Br-picture in the case where a constraint is placed on the reference relationship for a Br-picture. By placing a constraint such as that described above, the Br-picture which is a first field of the third frame can only refer to the field pairs of the two P-frames located ahead and behind, as shown in FIG. 4. Therefore, two reference pictures are eliminated, and the Br-picture which is the first field of the third frame can select a reference picture from the four P-picture fields. Furthermore, the Br-picture which is the second field of the third frame can only refer to the field pairs of the two P-frames located ahead and behind, and the first field in the same frame to which it belongs. With this, two reference pictures are eliminated, and the Br-picture which is the second field of the third frame can select, from among the five fields, a reference picture with which coding efficiency will be highest. With this, the complexity of the reference relationship for Br-pictures is reduced.

FIG. 5 is a diagram showing an example of the reference relationship of a Br-picture in the case where a constraint is placed on the reference relationship for a Br-picture. In the same manner, for example, the following constraint is placed: "A B-picture can refer to a nearest I-frame or P-frame located forward and backward in reproduction order, in the case of the progressive method; and can refer to a field pair included in the nearest I-frame or P-frame located forward and backward in reproduction order, in the case of the interlaced method. In addition, the B-picture can refer to a field pair included in the nearest Br-frame located forward or backward in reproduction order, but the number of reference pictures that can be referred to is four.

Non-Patent Reference 1: MPEG-2, H.264 (MPEG-4 AVC)

However, when the aforementioned constraints are placed, the pictures that can be referred to change depending on whether coding is performed with the current picture as a B-picture or a Br-picture, as can be seen in FIG. 4 and FIG. 5. Consequently, it follows that coding efficiency will be different depending on whether coding is performed with the current picture as a B-picture or as a Br-picture.

SUMMARY OF THE INVENTION

Consequently, the object of the present invention is to provide a picture coding apparatus having excellent coding efficiency, which can adaptively select the picture type for a current picture to be decoded, by placing a constraint on the reference relationship of Br-pictures and B-pictures, and making use of the change in coding efficiency according to the changing of the reference picture of the current picture to be decoded.

In order to achieve the aforementioned object, the picture coding apparatus according to the present invention is a picture coding apparatus which codes a current picture to be coded, using one of intra-prediction, first inter-prediction, and second inter-prediction, the intra-prediction being prediction using a correlation within the current picture without performing prediction on a time axis, the first inter-prediction being prediction using a correlation between the current picture and one reference picture on the time axis, and the second inter-prediction being prediction using a correlation between the current picture and an interpolated picture of two reference pictures on the time axis, the picture coding apparatus comprising: a feature amount extracting unit which extracts respective feature amounts of the current picture and a picture having a specific relationship with the current picture; a correlation degree calculating unit which calculates, based on the feature amount extracted by the feature amount extracting unit, a correlation degree indicating a degree of image similarity between the current picture and the picture having a specific relationship with the current picture; a picture type determining unit which adaptively determines, depending on the correlation degree, a picture type for the current picture, from picture types on which the second inter-prediction is performed and of which there are two types including a picture that can be referred to by another picture, and a picture that cannot be referred to by another picture; and a coding unit which codes the current picture according to the determined picture type.

Furthermore, the feature amount extracting unit may extract respective feature amounts of a first field of a current frame to be coded which is the current picture, a second field of the current frame, and a second field of a frame coded immediately ahead of the current frame, the correlation degree calculating unit may calculate two correlation degrees which are the respective degrees of image similarity between one of the fields which belong to the current frame and each of the two other fields, from among the respective fields whose feature amount has been extracted, the correlation degree having a lower value as the degree of image similarity increases, and the picture type determining unit may: determine the picture type of the current frame to be a Br-picture that can be referred to by another picture, in the case where, between the two correlation degrees, the correlation degree between the fields which belong to the same frame is lower than the degree of correlation between the fields which belong to the different frames; and determine the picture type of the current frame to be a B-picture which cannot be referred to by another picture, in all other cases.

In addition, the correlation degree calculating unit may calculate a first correlation degree and a second correlation degree, the first correlation degree being a correlation degree between the first field of the current frame and the second field of the frame coded immediately ahead of the current frame, and the second correlation degree being a correlation degree between the first field of the current frame and the second field of the current frame, and the picture type determining unit may compare the first correlation degree and the second correlation degree calculated by the correlation degree calculating unit, and determine the picture type for the current frame to be the Br-picture in the case where the comparison shows that the second correlation degree is lower than the first correlation degree.

Furthermore, the correlation degree calculating unit according to the present invention may calculate a third correlation degree and a fourth correlation degree, the third correlation degree being a correlation degree between the second field of the current frame and the second field of the frame coded immediately ahead of the current frame, and the fourth correlation degree being a correlation degree between the second field of the current frame and the first field of the current frame, and the picture type determining unit may compare the third correlation degree and the fourth correlation degree calculated by the correlation degree calculating unit, and determine the picture type for the current frame to be the Br-picture in the case where the comparison shows that the fourth correlation degree is lower than the third correlation degree.

The picture type determining unit according to the present invention may calculate a difference or a ratio between the two correlation degrees calculated by the correlation degree calculating unit, compare a result of the calculation with a predetermined threshold, and determine the picture type for the current frame to be the Br-picture in the case where the comparison shows that the correlation degree between the fields which belong to the same frame is lower than the correlation degree between the fields which belong to the different frames.

Furthermore, the feature amount extracting unit according to the present invention may extract, as the respective feature amounts of the second field of the frame coded immediately ahead of the current frame, the first field of the current frame, and the second field of the current frame, a summation of luminance values of pixels within the respective fields, the correlation degree calculating unit may calculate, as the two correlation degrees, differences between the respective summations of luminance values of the corresponding fields or absolute values of the differences between the respective summations of luminance values of the corresponding fields, and the picture type determining unit may determine the picture type for the current frame to be the Br-picture in the case where the correlation degree between the fields which belong to the same frame is lower than the correlation degree between the fields which belong to the different frames.

In addition, the feature amount extraction unit according to the present invention may extract, as the respective feature amounts of the second field of the frame coded immediately ahead of the current frame, the first field of the current frame, and the second field of the current frame, a luminance value of each pixel within each of the fields, the correlation degree calculating unit may calculate, as the two correlation degrees, summations of respective differences between the luminance values of co-located pixels in the corresponding fields, or summations of absolute values of the differences between the luminance values of co-located pixels in the corresponding fields, and the picture type determining unit may determine the picture type for the current frame to be the Br-picture in the case where the correlation degree between the fields which belong to the same frame is lower than the correlation degree between the fields which belong to the different frames.

Furthermore, the picture type determining unit according to the present invention may determine the picture type of a second of two B-pictures to be either a Br-picture or a B-picture, depending on the calculated correlation degree, the two B-pictures appearing between an I-picture and a P-picture or between two P-pictures, in display order.

As described above, according to the present invention, the optimal picture type can be determined from the feature amounts between the current picture to be coded and a specific picture (the picture coded immediately ahead), and thus it is possible to improve coding efficiency and achieve high picture quality for coded pictures, even when there is a constraint on the reference picture that can be referred to depending on the picture type.

It should be noted that the present invention can be implemented, not only as an apparatus, but also as: a method having, as steps, the processing units included in such apparatus; a program causing a computer to execute such steps; a computer-readable recording medium, such as a CD-ROM, on which such program is recorded; and information, data, or a signal representing such program. Moreover, such program, information, data and signal may be distributed via a communication network such as the Internet.

Further Information About Technical Background to this Application

The disclosure of Japanese Patent Application No. 2007-270739 filed on Oct. 17, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

In FIG. 7,(b) shows the reference relationship and coding efficiency of each field of the field pair of the third frame of the television picture when the third frame is a B-picture, with the allocation of the television picture fields for each film-frame of the movie-film being the same as in (a) in FIG. 7;

In FIG. 8,(b) shows the reference relationship and coding efficiency of each field of the field pair of the third frame of the television picture when the third frame is a B-picture, with the allocation of the television picture fields for each film-frame of the movie-film being the same as in (a) in FIG. 8;

In FIG. 9,(b) shows the reference relationship and coding efficiency of each field of field pair of the third frame of the television picture when the third frame is a Br-picture, with the allocation of the television picture fields for each film-frame of the movie-film being the same as in (a) in FIG. 9;

In FIG. 10,(b) shows the reference relationship and coding efficiency of each field of field pair of the third frame of the television picture when the third frame is a Br-picture, with the allocation of the television picture fields for each film-frame of the movie-film being the same as in (a) in FIG. 10;

In FIG. 11,(b) shows the reference relationship and coding efficiency of each field of the field pair of the third frame of the television picture when the third frame is a Br-picture, with the allocation of the television picture fields for each of the film-frames of the movie-film being the same as in (a) in FIG. 11;

DESCRIPTION OF THE INVENTION

Hereinafter, the embodiments of the picture coding apparatus according to the present invention shall be described with reference to the drawings.

(First Embodiment)

First, the configuration of the picture coding apparatus according to a first embodiment of the present invention shall be described.

Figure 1:
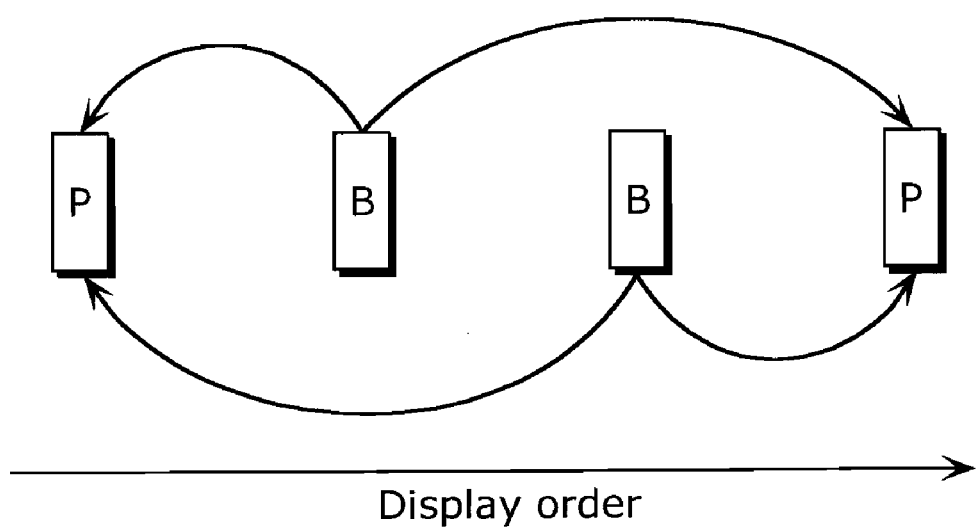
FIG. 1 is a diagram showing an example of the reference relationship of a B-picture in the case where Br-pictures are not used, in coding in the conventional progressive method.
Figure 2:
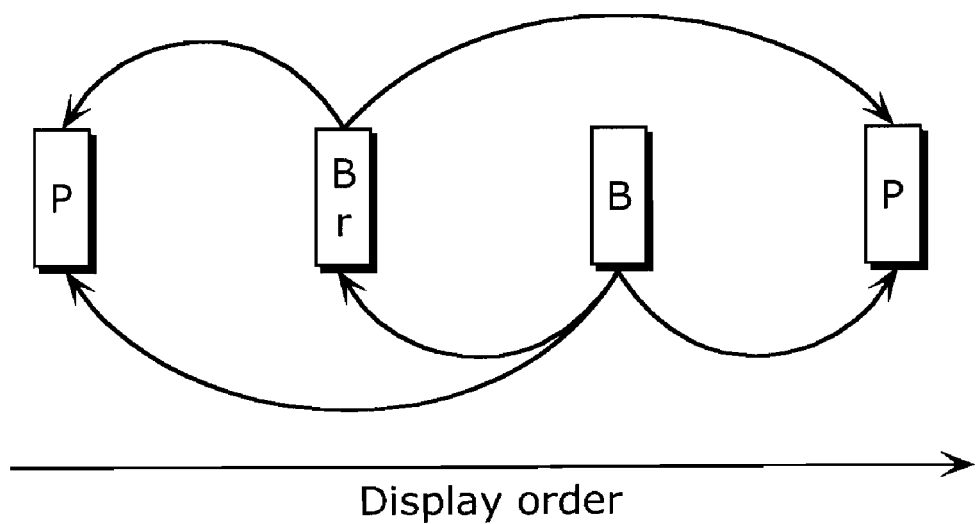
FIG. 2 is a diagram showing an example of the reference relationship of a B-picture in the case where Br-pictures are used, in coding in the conventional progressive method.
Figure 3:
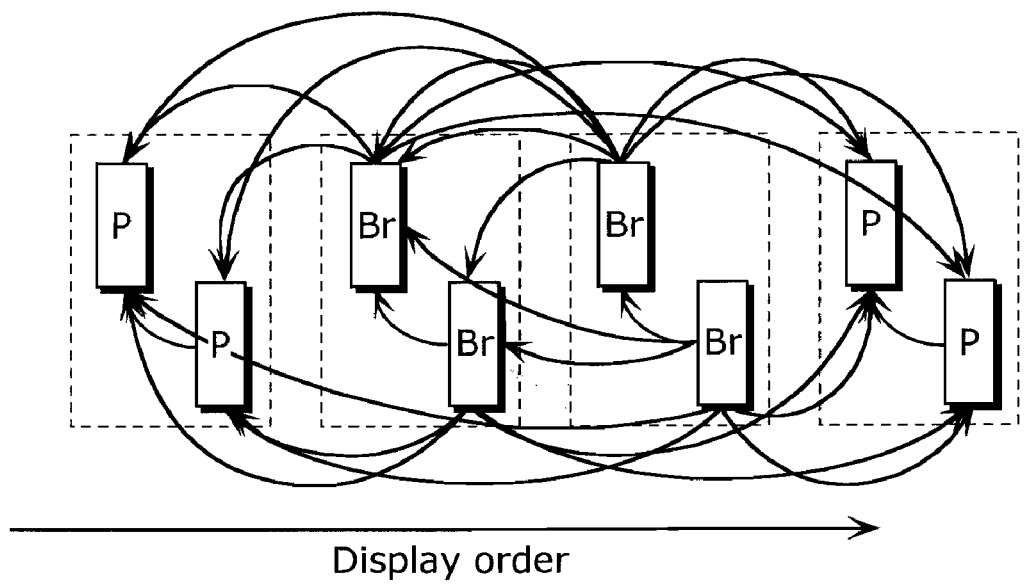
FIG. 3 is a diagram showing an example of the reference relationship in the case of coding in the field picture structure so that the display order becomes P→Br→Br→P.
Figure 4:
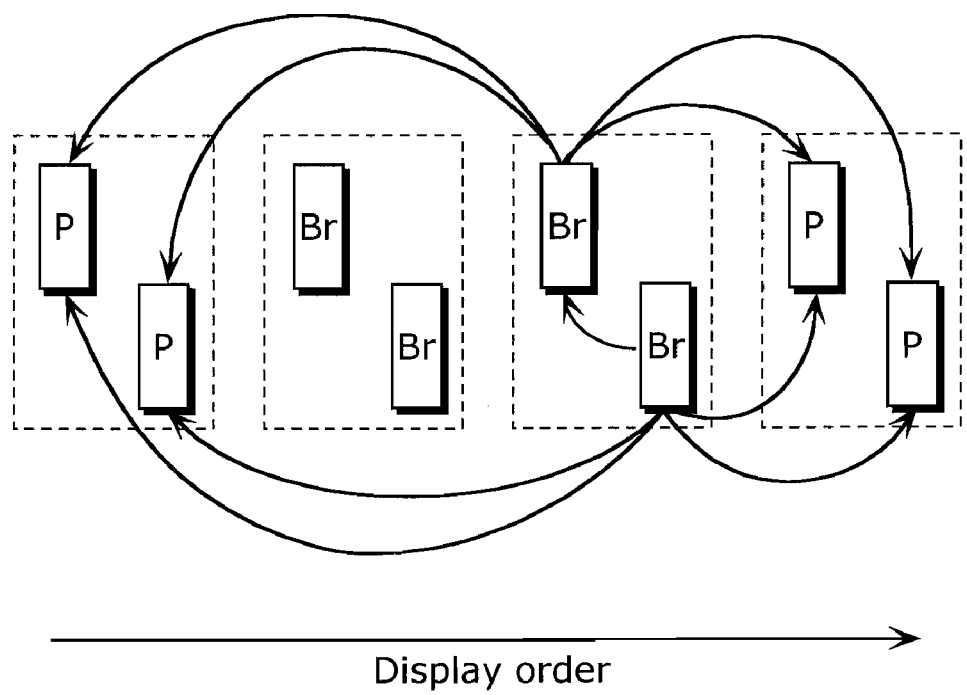
FIG. 4 is a diagram showing an example of the reference relationship of Br-pictures in the case where a constraint is placed on the conventional reference relationship of Br-pictures.
Figure 5:
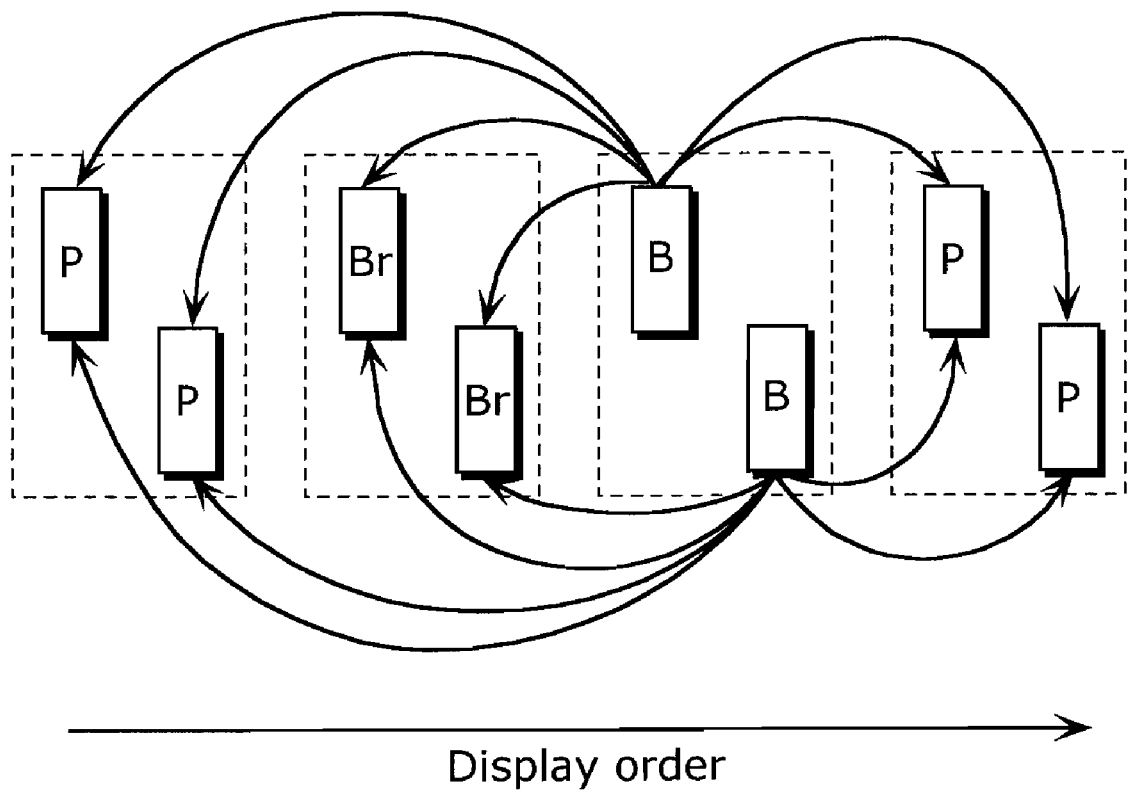
FIG. 5 is a diagram showing an example of the reference relationship of B-pictures in the case where a constraint is placed on the conventional reference relationship of B-pictures.
Figure 6:
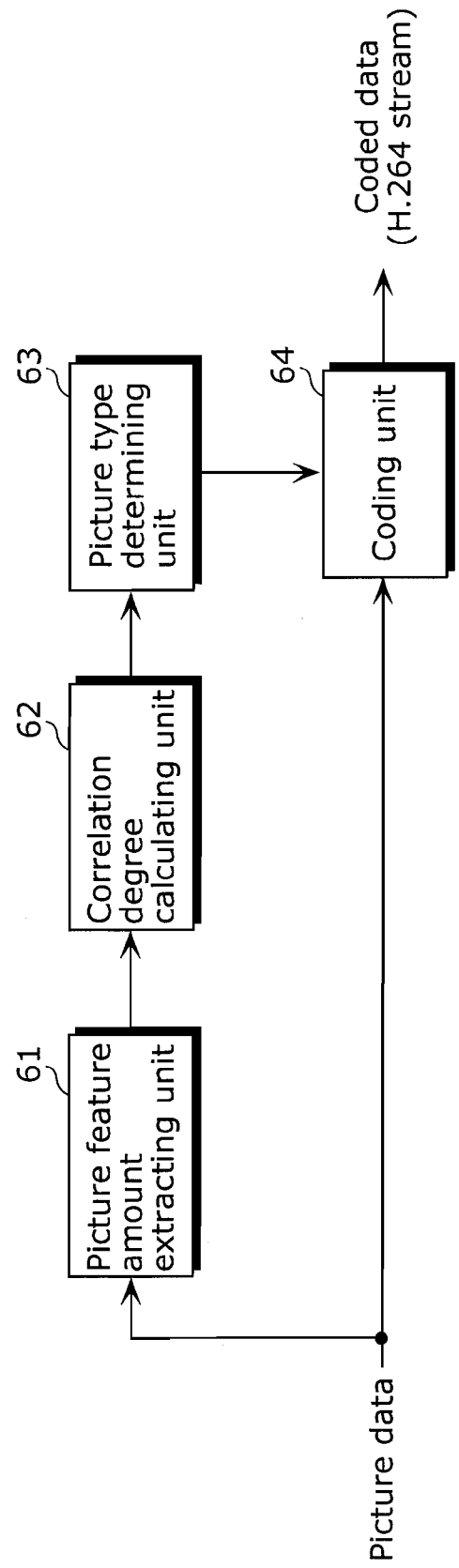
FIG. 6 is a block diagram showing the configuration of the picture coding apparatus according to first, second, third, and fourth embodiments of the present invention.

FIG. 6 is a block diagram showing the configuration of the picture coding apparatus according to the first embodiment of the present invention. The picture coding apparatus shown in FIG. 6 has picture data as an input, and the placement of a constraint on the reference relationships of a B-picture and a Br-picture as a premise. The picture coding apparatus determines the picture type of the current picture to be coded based on the luminance of the Current picture and pictures before and after the current picture in the case where the current picture is a B- or a Br-picture, and outputs a coded H.264 bit stream. The picture coding apparatus includes a picture feature amount extracting unit 61, a correlation degree calculating unit 62, a picture type determining unit 63, and a coding unit 64.

FIG. 7 to FIG. 14 are diagrams showing the relationship between reference relationships and coding efficiency in the case where 2-3 pull down is performed on the input pictures. It should be noted that 2-3 pull down refers to the conversion (pull down) of pictures recorded at 24 frames/second such as in a movie-film, into a 30 frame (60 field)/second picture signal used in television broadcasts. In the diagram, the areas indicated by hatching represent 1 film-frame of movie-film. As shown in the diagram, in the 2-3 pull down, conversion is performed by alternately allocating each film-frame of the movie-film to the picture signal for two fields and to the picture signal for three fields of television pictures. Furthermore, in the diagram, the thicker the arrow for indicating a reference relationship is, the higher the coding efficiency. It should be noted that, in addition to the constraint described above, it is assumed here that a constraint is placed in which each macroblock of a B-picture and Br-picture can only refer to a total of four pictures, specifically, the temporally nearest two forward pictures and two backward pictures that can be referred to by each of the macroblock.

Figure 7:
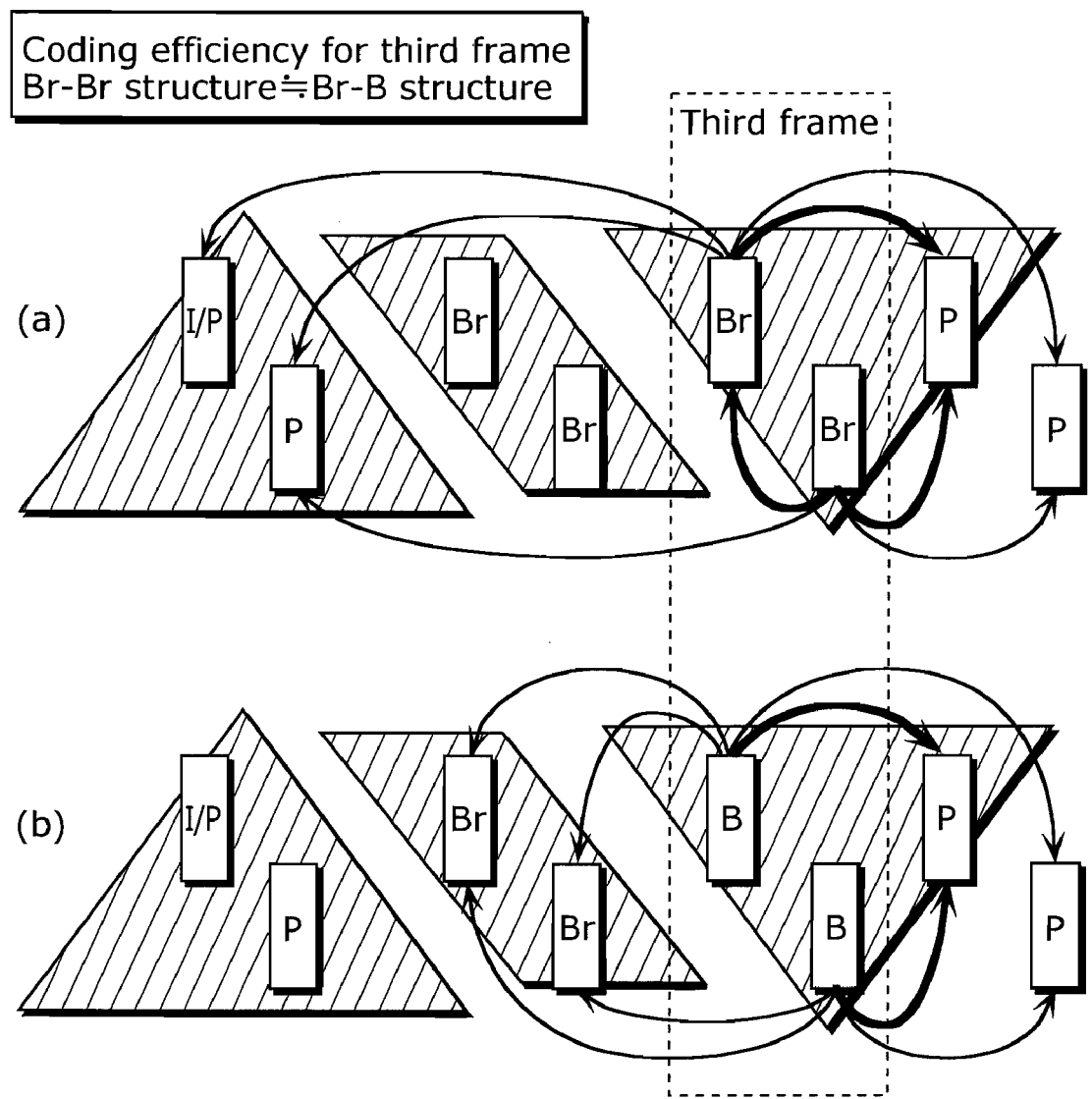
In FIG. 7,(a) shows the reference relationship and coding efficiency of each field of the field pair of the third frame of the television picture when the third frame is a Br-picture, in the case where the first film-frame of a movie-film is allocated to the first frame of a television picture, the second film-frame is allocated to the second frame of the television picture, the third film-frame is allocated to the third frame and the first field of the fourth frame of the television picture.

(a) in FIG. 7 shows the reference relationship and coding efficiency of each field of the field pair of the third frame of the television picture when the third frame is a Br-picture, in the case where the first film-frame of a movie-film is allocated to the first frame of a television picture, the second film-frame is allocated to the second frame of the television picture, the third film-frame is allocated to the third frame and the first field of the fourth frame of the television picture. (b) in FIG. 7 shows the reference relationship and coding efficiency of each field of the field pair of the third frame of the television picture when the third frame is a B-picture, with the allocation of the television picture fields for each film-frame of the movie-film being the same as in (a) in FIG. 7. In (a) in FIG. 7, for example, the first film-frame of the movie-film is allocated to three fields including a starting field which is empty, and the I- (or P-) field and P field which are the first frame of a television broadcast. Furthermore, the second film-frame is allocated so as to be equivalent to the two Br-fields of the second frame. In addition, in (a) in FIG. 7, the first field of the third frame is copied onto the first field of the fourth frame so that the third film-frame can be allocated to the two Br-fields of the third frame and the first field of the fourth frame which is a P-picture. It should be noted that in (b) in FIG. 7, the allocation of the third film-frame to the two B-fields of the third frame and the first field of the fourth frame which is a P picture is the point of difference from (a) in FIG. 7.

Furthermore, in the third frame shown in (a) in FIG. 7, the Br-field which is the first field can refer to the I-field which is the first field of the first frame, the P-field which is the second field of the first frame, the P-field which is the first field of the fourth frame, and the P-field which is the second field of the fourth frame. However, in this case, rather than referring to any other field, coding efficiency is highest when the first field of the third frame refers to the P-field which is the first field of the fourth frame. This is because the first field of the third frame is referring to a picture of an identical first field in the same film-frame. In addition, the Br-field which is the second field of the third frame can refer to the forward and backward P-fields, that is, the second field of the first frame, the first field of the fourth frame and the second field of the fourth frame, and the first field of the third frame which is its field pair in the same frame. However, in this case, rather than referring to either of the P-field which is the second field of the first frame and the P-field which is the second field of the fourth frame, coding efficiency becomes higher when the second field of the third frame refers to the Br-field which is its field pair in the same frame, and the P-field which is the first field of the fourth frame. This is because the second field of the third frame is referring to a picture of a different field but in the same film-frame. In other words, each of the Br-pictures of the field pair of the third frame has a reference picture which allows highly efficient coding.

On the other hand, (b) in FIG. 7 shows the reference pictures in the case where the fields of the field pair of the third frame are coded as B-pictures. As in the case where the fields of the field pair of the third frame are coded as Br-fields, in this case too, the B-field which is the first field of the third frame can refer to the coding-efficient first field of the fourth frame. Furthermore, the B-field which is the second field of the third frame can refer to the coding-efficient P-picture which is the first field of the fourth frame. Therefore, in the 2-3 pull down, in the case where fields are allocated as shown in (*a*) and (*b*) in FIG. 7, there is no significant difference in coding efficiency even when the field pair of the third frame are coded as Br-pictures or coded as B-pictures.

Figure 8:
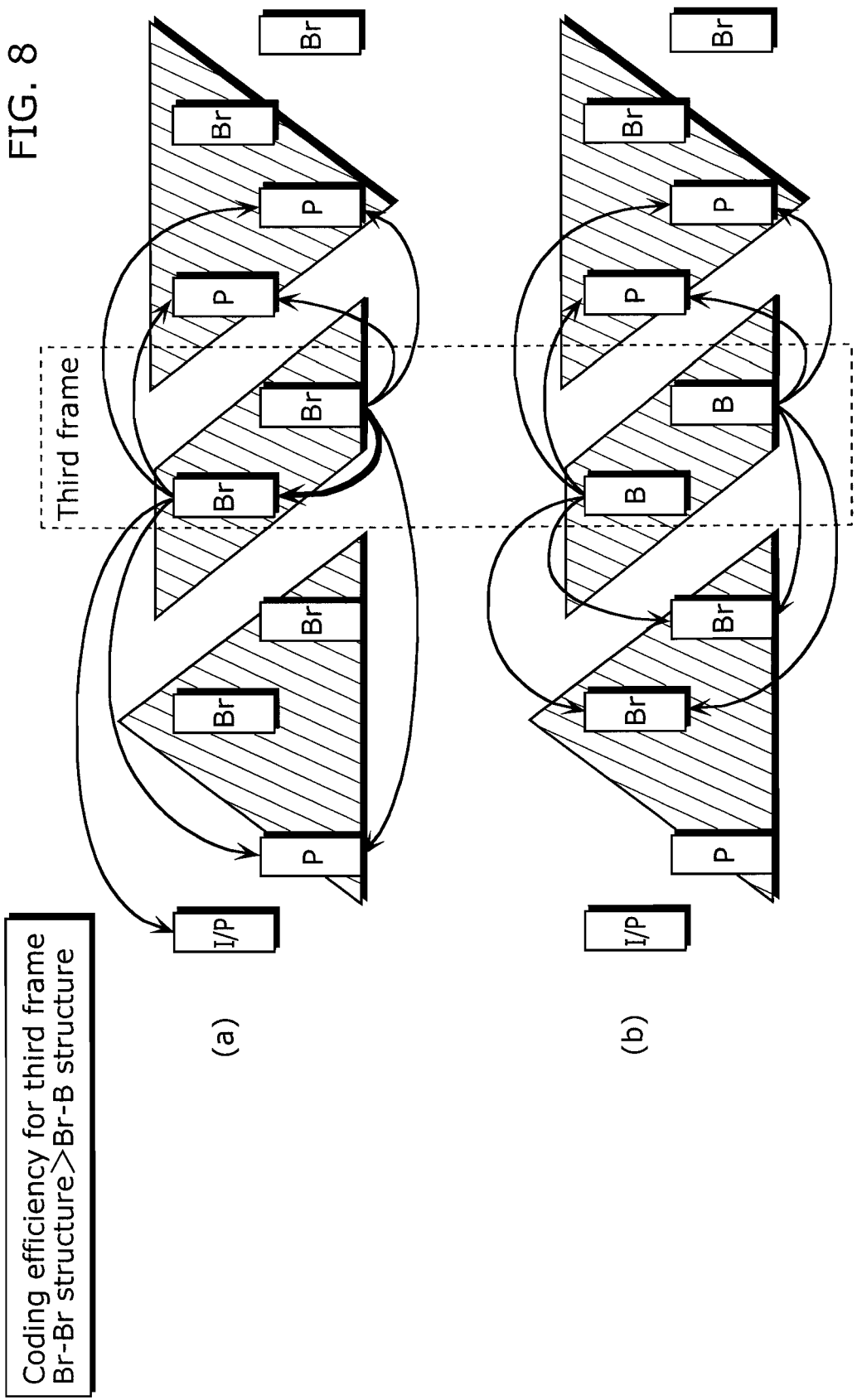
In FIG. 8,(a) shows the reference relationship and coding efficiency of each field of the field pair of the third frame of the television picture when the third frame is a Br-picture, in the case where the first film-frame (not shown) of a movie-film is allocated to the first field of the first frame of a television picture, the second film-frame is allocated to the second field of the first frame and the second frame of the television picture, the third film-frame is allocated to the third frame of the television picture, and the fourth film-frame is allocated to the fourth frame and the first field of the fifth frame of the television picture.

(*a*) in FIG. 8 shows the reference relationship and coding efficiency of each field of the field pair of the third frame of the television picture when the third frame is a Br-picture, in the case where the first film-frame (not shown) of a movie-film is allocated to the first field of the first frame of a television picture, the second film-frame is allocated to the second field of the first frame and the second frame of the television picture, the third film-frame is allocated to the third frame of the television picture, and the fourth film-frame is allocated to the fourth frame and the first field of the fifth frame of the television picture. Furthermore, (*b*) in FIG. 8 shows the reference relationship and coding efficiency of each field of the field pair of the third frame of the television picture when the third frame is a B-picture, with the allocation of the television picture fields for each film-frame of the movie-film being the same as in (*a*) in FIG. 8. (*a*) in FIG. 8 is an example in which the display order is P→Br→Br→P, and the first frame (not shown) of the movie-film is allocated to the I- (or P-) field which is the first field of the first frame. The second field of the first frame is copied onto the second field of the second frame so that the second film-frame becomes the three fields including the P-field which is the second field of the first frame, and the two Br-fields of the second frame. In addition, the third film-frame is allocated to the two Br-fields of the third frame. In order for the fourth film-frame to be allocated to the two P-fields of the fourth frame and the first field of the Br-fields of the fifth frame of the television picture, the first field of the fourth frame is copied onto the first field of the fifth frame and used by being duplicated.

When the 2-3 pull down is applied for each field in a 60*i* (60 frame/s interlace) as shown in (*a*) in FIG. 8, the Br-field which is the first field of the third frame can refer to the I- (or P-) picture which is the first field and the P-field which is the second field of the first frame, and the P-field which is the first field and the P-field which is the second field of the fourth frame. However, in this case, since the Br-field which is the first field of the third frame refers to pictures of respectively different film-frames, coding efficiency becomes low. On the other hand, the Br-field which is the second field of the third frame refers to its field pair which is a picture of the same film-frame, that is, the Br-field which is the first field. Aside from its field pair, the Br-field of the second field can refer to the P-field which is the second field of the first frame, the P-field which is the first field of the fourth frame and the P-field which is the second field of the fourth frame. However, since this would mean referring to pictures from respectively different film-frames, coding efficiency is highest when the Br-field of the first field, which is a picture in the same film-frame, is referred to.

In contrast, in the case where the third frame is assumed to be a B-picture as shown in (*b*) in FIG. 8, the B-field which is the first field of the third frame refers to the Br-field which is the first field and the Br-field which is the second field of the second frame, and the P-field which is the first field and the P-field which is the second field of the fourth frame. In this case, since the Br-field which is the first field of the third frame refers to pictures of respectively different film-frames, coding efficiency becomes low. Furthermore, the B-field which is the second field of the third frame refers to the Br-field which is the first field and the Br-field which is the second field of the second frame, and the P-field which is the first field and the P-field which is the second field of the fourth frame. Therefore, in the same manner as in the B-field which is the first field of the third frame, the B-field which is the second field refers to pictures of respectively different film-frames, and thus coding efficiency becomes low. Therefore, in the case where the allocations as shown in (*a*) and (*b*) in FIG. 8 are performed for the 2-3 pull down, coding efficiency becomes higher when the third frame is a Br-picture than when the third frame is a B-picture.

Figure 9:
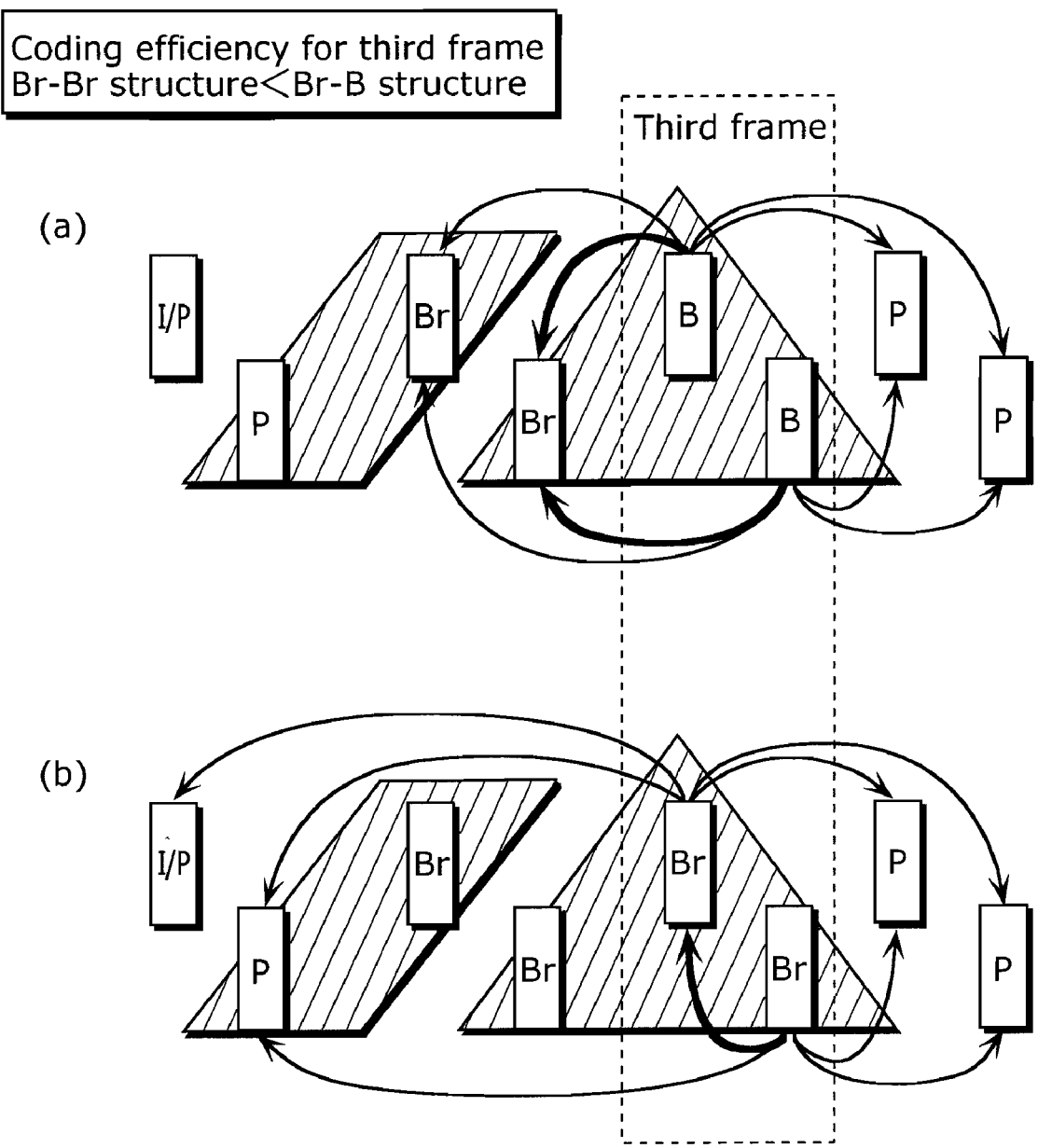
In FIG. 9,(a) shows the reference relationship and coding efficiency of each field of the field pair of the third frame of the television picture when the third frame is a B-picture, in the case where the first film-frame (not shown) of a movie-film is allocated to the first field of the first frame of a television picture, the second film-frame is allocated to the P-field which is the second field of the first frame and the Br-field which is the first field of the second frame of the television picture, the third film-frame is allocated to the Br-field which is the second field of the second frame and the B-fields which are the field pair of the third frame of the television picture, and the fourth film-frame (not shown) is allocated to the P-frames of the field pair of the fourth frame of the television picture.

(*a*) in FIG. 9 shows the reference relationship and coding efficiency of each field of the field pair of the third frame of the television picture when the third frame is a B-picture, in the case where the first film-frame (not shown) of a movie-film is allocated to the first field of the first frame of a television picture, the second film-frame is allocated to the P-field which is the second field of the first frame and the Br-field which is the first field of the second frame of the television picture, the third film-frame is allocated to the Br-field which is the second field of the second frame and the B-fields which are the field pair of the third frame of the television picture, and the fourth film-frame (not shown) is allocated to the P-frames of the field pair of the fourth frame of the television picture. Furthermore, (*b*) in FIG. 9 shows the reference relationship and coding efficiency of each field of field pair of the third frame of the television picture when the third frame is a Br-picture, with the allocation of the television picture fields for each film-frame of the movie-film being the same as in (*a*) in FIG. 9.

(*a*) in FIG. 9 shows the relationship between the reference relationship and the coding efficiency in the case where 2-3 pull down is performed on the input pictures in an example in which the display order is P→Br→B→P. In the 2-3 pull down in (*a*) in FIG. 9 the first film-frame (not shown) is allocated to only the I-(or P-) picture which is the first field of the first frame of the television picture, and the second film-frame is allocated to the P-field which is the second field of the first frame and the Br-field which is the first field of the second frame. In this example, the third film-frame is allocated to the three fields including the Br-field which is the second field of the second frame and the two B-fields which are the field pair of the third frame. As such, the Br-field which is the second field of the second frame is copied onto the B-field which is the second field of the third frame. Furthermore, the fourth film-frame (not shown) of the movie-film is allocated to the two P-fields which are the field pair of the fourth frame. As a result, the B-field which is the first field of the third frame can refer to the Br-fields which are the field pair of the second frame, and the P-fields which are the field pair of the fourth frame. However, among these possible reference pictures, coding efficiency becomes higher when the Br-field which is the second field of the second frame is referred to, since a picture in the same film-frame is referred to. Furthermore, in the same manner as the B-field of the first field, the B-field which is the second field of the third frame can refer to the two Br-fields which are the field pair of the second frame and the P-fields which are the field frame of the fourth frame. In particular, among these possible reference pictures, coding efficiency becomes even higher when the B-field which is the first field refers to the Br-field which is the second field of the second frame, than when referring to the Br-field which is the second field of the second frame, since an exact, same picture which is of an identical field and in the same film-frame is referred to. This is because although the first field of the third frame is referring to a picture in the same film-frame, the picture of a different field is referred to.

(*b*) in FIG. 9 shows an example in which the allocation of the television picture fields for each film-frame of the movie-film is the same as in (*a*) in FIG. 9, and the display order is P→Br→Br→3P. The Br-field which is the first field of the third frame cannot refer to the Br-field which is the second field which is coded thereafter. In addition, since there is the constraint of not being able to refer to the Br-picture of another frame, the Br-field which is the first field of the third frame can refer to the I- (or P-) picture which is the first field of the first frame, the P-picture which is the second field of the first frame and the two P-fields which are the field pair of the fourth frame. In this case, since all the fields of the first frame and the fourth frame are pictures in different film-frames as the first field of the third frame, coding efficiency becomes low. On the other hand, the Br-field which is the second field of the third frame can refer to the P-field which is the second field of the first frame, the Br-field which is the first field of the third frame, and the two P-fields which are the field pair of the fourth frame. Among these possible reference pictures, coding efficiency becomes higher when the second field of the third frame refers to the Br-field which is the first field of the third frame, which is its field pair. This is because the second field of the third frame is referring to a picture in the same film-frame.

In the case where the allocation of television picture fields for each film-frame of the movie-film is performed as shown in (a) and (b) in FIG. 9, coding efficiency becomes higher when the third frame is a B-picture than when the third frame is a Br-picture. This is because, as described in (a) in FIG. 9, when the third frame is a B-picture, the B-field which is the second field of the third frame can refer to an exact, same picture which is of an identical field and in the same film-frame. Furthermore, even the first field of the third frame can refer to a picture of a different field but in the same film-frame.

Figure 10:
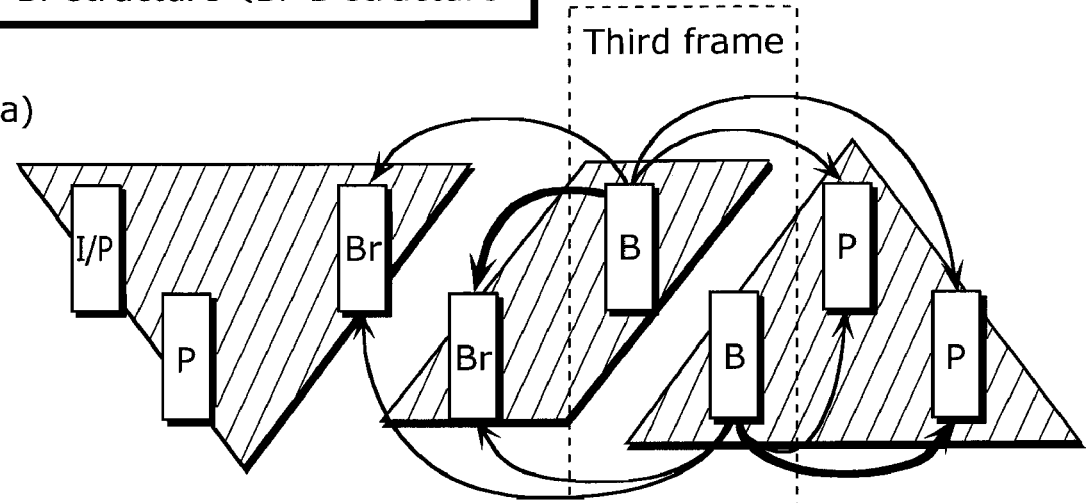
In FIG. 10,(a) shows the reference relationship and coding efficiency of each field of the field pair of the third frame of the television picture when the third frame is a B-picture, in the case where the first film-frame of a movie-film is allocated to the I- (or P-) field and the P-field which are the field pair of first field of the first frame and the Br-field which is the first field of the second frame of a television picture, the second film-frame is allocated to the Br-field which is the second field of the second frame and the B-field which is the first field of the third frame of the television picture, and the third film-frame is allocated to the B-field which is the second field of the third frame and the two P-fields which are the field pair of the fourth frame of the television picture.
Figure 10:
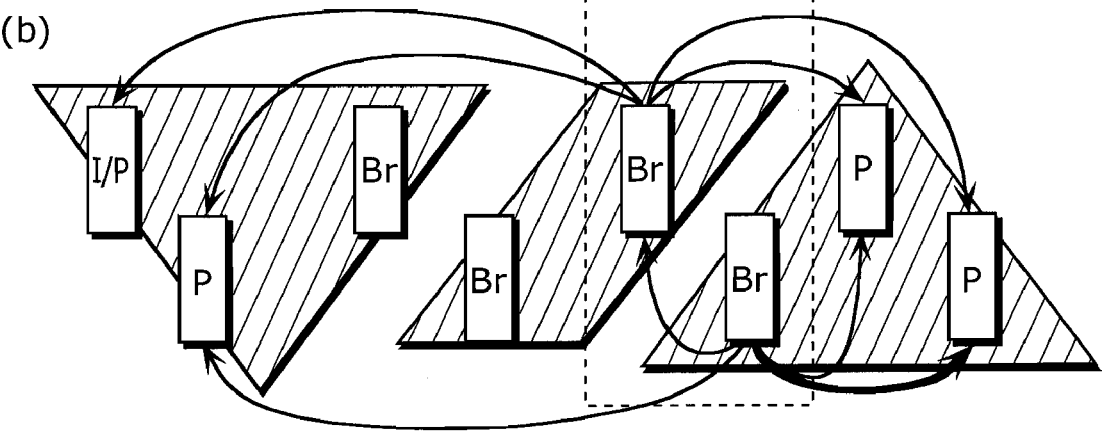

(a) in FIG. 10 shows the reference relationship and coding efficiency of each field of the field pair of the third frame of the television picture when the third frame is a B-picture, in the case where the first film-frame of a movie-film is allocated to the I- (or P-) field and the P-field which are the field pair of first field of the first frame and the Br-field which is the first field of the second frame of a television picture, the second film-frame is allocated to the Br-field which is the second field of the second frame and the B-field which is the first field of the third frame of the television picture, and the third film-frame is allocated to the B-field which is the second field of the third frame and the two P-fields which are the field pair of the fourth frame of the television picture. Furthermore, (b) in FIG. 10 shows the reference relationship and coding efficiency of each field of field pair of the third frame of the television picture when the third frame is a Br-picture, with the allocation of the television picture fields for each film-frame of the movie-film being the same as in (a) in FIG. 10.

In the example shown in (a) in FIG. 10, the B-field which is the first field of the third frame can refer to the two Br-fields which are the field pair of the second frame, and the two P-fields which are field frames of the fourth frame. In this case, coding efficiency becomes higher when the first field of the third frame refers to the Br-field which is the second field of the immediately preceding second frame, since a picture of a different frame but in the same film-frame is referred to. This is because the other three fields that can be referred to, that is, the first field of the second frame, the first field of the fourth frame, and the second field of the fourth frame, are all pictures in different film-frames. Furthermore, in the same manner as with the first field of the third frame, the B-field which is the second field of the third frame can refer to the two Br-fields which are the field pair of the immediately-preceding second frame, and the two P-fields which are field frames of the fourth frame. In this case, rather than referring to the field pair of the second frame, coding efficiency becomes higher when the second field of the third frame refers to the two P-fields which are the field pair of the fourth frame since pictures in the same film-frame are referred to. Moreover, in this case in particular, rather than referring to the P-field which is the first field of the fourth frame, coding efficiency becomes even higher when the P-field which is the second field is referred to, since an exact, same picture which is of an identical field and in the same film-frame is referred to.

(b) in FIG. 10 shows an example in which the allocation of the television picture fields for each film-frame of the movie-film is the same as in (a) in FIG. 10, and the display order is P→Br→Br→P. The Br-field which is the first field of the third frame can refer to the I- (or P-) field which is the first field of the first frame, the P-field which is the second field of the first frame, and the two P-fields which are the field pair of the fourth frame. In this case, since all the fields of the first frame and the fourth frame are pictures in different film-frames as the first field of the third frame, coding efficiency becomes low. On the other hand, the Br-field which is the second field of the third frame can refer to the P-field which is the second field of the first frame, the Br-field which is the first field of the third frame, and the two P-fields which are the field pair of the fourth frame. Among these possible reference pictures, coding efficiency becomes higher when the second field of the third frame refers to the two P-fields which are the field pair of the fourth frame, since pictures in the same film-frame are referred to. Moreover, in this case in particular, rather than referring to the P-field which is the first field of the fourth frame, coding efficiency becomes even higher when the P-field which is the second field is referred to, since an exact, same picture which is of an identical field and in the same film-frame is referred to.

From the description above, in the case where the allocation of television picture fields for each film-frame of the movie-film is performed as shown in (a) and (b) in FIG. 10, coding efficiency becomes higher when the third frame is a B-picture than when the third frame is a Br-picture. This is because, in the case where the third frame is a B-picture, both the first field and the second field can refer to a picture in the same film-frame that makes coding efficiency higher. In particular, the B-field which is the second field of the third frame can refer to an exact, same picture which is of an identical field and in the same film-frame. Furthermore, even the first field of the third frame can refer to a picture of a different field but in the same film-frame. In contrast, in the case where the third frame is a Br-picture, approximately the same level of coding efficiency as a B-picture can be attained for the second field. However, coding efficiency becomes low for the first field since it is not possible to refer to a picture in the same film-frame.

Figure 11:
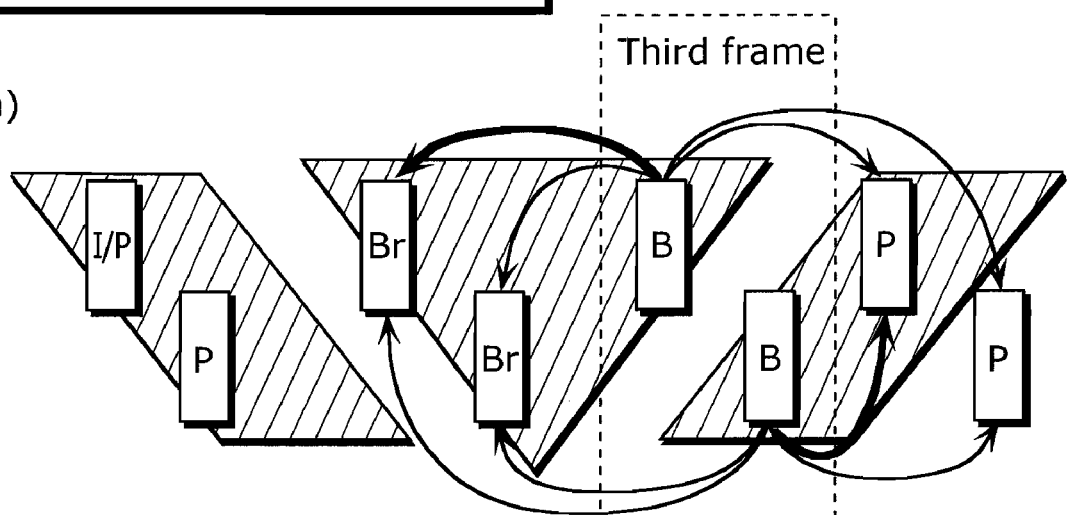
In FIG. 11,(a) shows the reference relationship and coding efficiency of each field of the field pair of the third frame of the television picture when the third frame is a B-picture, in the case where the first film-frame of a movie-film is allocated to the I- (or P-) field and the P-field which are the field pair of the first frame of a television picture, the second film-frame is allocated to the field pair of the second frame and the B-field which is the first field of the third frame of the television picture, the third film-frame is allocated to the B-field which is the second field of the third frame and the P-field which is the first field of the fourth frame of the television picture.
Figure 11:
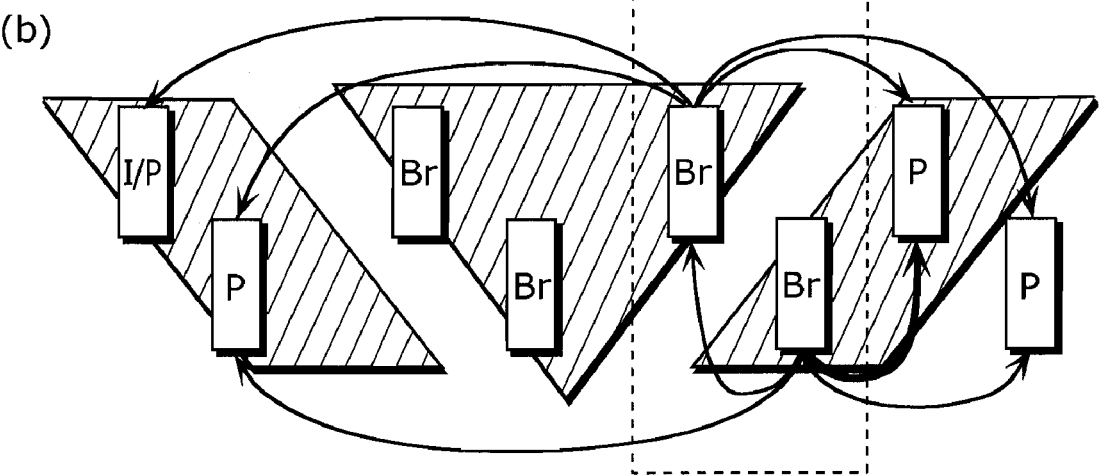

In addition, (a) in FIG. 11 shows the reference relationship and coding efficiency of each field of the field pair of the third frame of the television picture when the third frame is a B-picture, in the case where the first film-frame of a movie-film is allocated to the I- (or P-) field and the P-field which are the field pair of the first frame of a television picture, the second film-frame is allocated to the field pair of the second frame and the B-field which is the first field of the third frame of the television picture, the third film-frame is allocated to the B-field which is the second field of the third frame and the P-field which is the first field of the fourth frame of the television picture. Furthermore, (b) in FIG. 11 shows the reference relationship and coding efficiency of each field of the field pair of the third frame of the television picture when the third frame is a Br-picture, with the allocation of the television picture fields for each of the film-frames of the movie-film being the same as in (a) in FIG.

In this example, as shown in (a) in FIG. 11, the B-field which is the first field of the third frame can refer to the two Br-fields which are the field pair of the second frame, and the two P-fields which are field frames of the fourth frame. In this case, rather than referring to the P-fields which are the field pair of the fourth frame, coding efficiency becomes higher when the first field of the third frame refers to the two Br-fields which are the field pair of the second frame since pictures in the same film-frame are referred to. In this case, in particular, rather than referring to the Br-field which is the second field, coding efficiency becomes even higher when the Br-field which is the first field, which is of an identical field and in the same film-frame, is referred to, since an exact, same picture is referred to. Furthermore, in the same manner as with the first field which is its field pair, the B-field which is the second field of the third frame can refer to the two Br-fields which are the field pair of the second frame, and the two P-fields which are field frames of the fourth frame. However, since a picture in a different film-frame is referred to when the second field of the third frame refers to any of the Br-fields which are the forward field pair and the P-field which is the second field of the fourth frame, coding efficiency becomes low. In contrast, when the P-field which is the first field of the fourth frame is referred to, coding efficiency becomes higher since, although the field is different, a picture in the same film-frame is referred to.

Furthermore, (b) in FIG. 11 shows an example in which the allocation of the television picture fields for each film-frame of the movie-film is the same as in (a) in FIG. 11, and the display order is P→Br→Br→P. The Br-field which is the first field of the third frame can refer to the I- (or P-) field which is the first field of the first frame, the P-field which is the second field of the first frame, and the two P-fields which are the field pair of the fourth frame. In this case, since all the fields of the first frame and the fourth frame are pictures in different film-frames as the first field of the third frame, coding efficiency becomes low. On the other hand, the Br-field which is the second field of the third frame can refer to the P-field which is the second field of the first frame, the Br-field which is the first field of the third frame, and the two P-fields which are the field pair of the fourth frame. Among these possible reference pictures, coding efficiency becomes higher when the second field of the third frame refers to the P-field which is the first field of the fourth frame. This is because when the second field of the third frame refers to the first field of the fourth frame, a picture in the same field-frame is referred to.

From the description above, in the case where the allocation of television picture fields for each film-frame of the movie-film is performed as shown in (a) and (b) in FIG. 11, coding efficiency becomes higher when the third frame is a B-picture than when the third frame is a Br-picture. This is because, in the same manner as described for (a) and (b) in FIG. 10, in the case where the third frame is a B-picture, both the first field and the second field can refer to a picture in the same film-frame that makes coding efficiency higher. In particular, by referring to the first field of the second frame, the B-field which is the first field of the third frame can refer to an exact, same picture which is of an identical field and in the same film-frame. Furthermore, even the second field of the third frame can refer to a picture of a different field but in the same film-frame. In contrast, in the case where the third frame is a Br-picture, approximately the same level of coding efficiency as when the third frame is a B-picture can be attained for the second field. However, coding efficiency becomes low for the first field since it is not possible to refer to a picture in the same film-frame.

It should be noted that the changing of coding efficiency depending on the pattern of the reference relationship between fields, as described above, is not limited to the 2-3 pull down, and cases such as when a large object crosses the screen, or when MPEG-2 noise mixes into picture data such as in broadcast pictures, are also possible.

Figure 12:
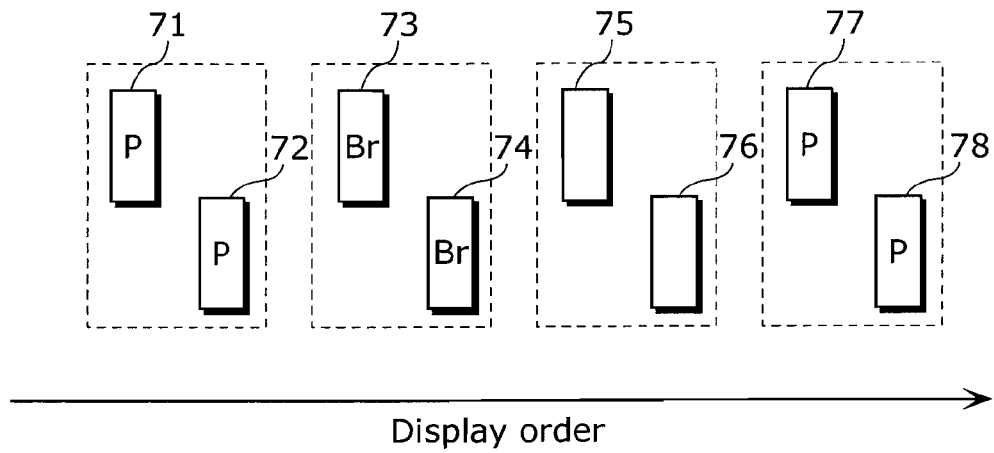
FIG. 12 is a diagram showing an example of the case of determining whether to assume, as a field pair of either Br-fields or B-fields, the second (picture 75 and picture 76) of two B-frames that are sandwiched between two P-frames in the case of coding with a field picture structure according to the interlace method.
Figure 13:
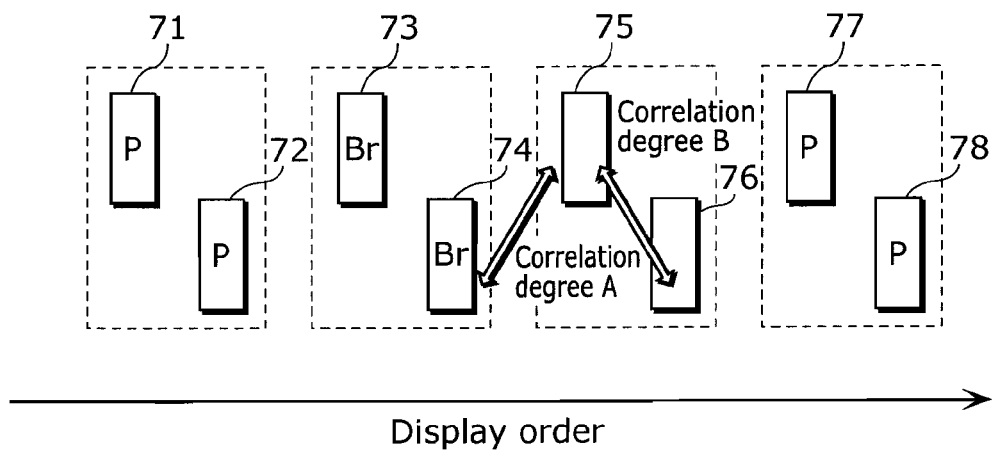
FIG. 13 is a diagram showing an example of a comparison pattern in the case of comparing the degree of correlation between pictures in order to determine the picture type for picture 75 and picture 76 shown in FIG. 12.

FIG. 12 is a diagram showing an example of the case of determining whether to assume, as a field pair of either Br-fields or B-fields, the second (picture 75 and picture 76) of two B-frames that are sandwiched between two P-frames in the case of coding with a field picture structure according to the interlace method. FIG. 13 is a diagram showing an example of a comparison pattern in the case of comparing the degree of correlation between pictures in order to determine the picture type for picture 75 and picture 76 shown in FIG. 12. The picture feature amount extracting unit 61 is an example of "a feature amount extracting unit configured to extract a feature amount of the current picture and a picture having a specific relationship with the current picture", "the feature amount extracting unit configured to extract respective feature amounts of a first field of a current frame to be coded which is the current picture, a second field of the current frame, and a second field of a frame coded immediately ahead of the current frame" and "the feature amount extracting unit configured to extract, as the respective feature amounts of the second field of the frame coded immediately ahead of the current frame, the first field of the current frame, and the second field of the current frame, a summation of luminance values of pixels within the respective fields". The picture feature amount extracting unit 61 has as inputs: the second field (picture 74) of the picture (second frame) coded nearest the third frame which is the current picture to be coded; and the picture data (the field pair of pictures 75 and 76) of current picture to be coded, and calculates the feature amount on a per-field basis. Here, the feature amount is assumed to be the summation of respective luminance values of each field. Furthermore, the summation of respective luminance values of each field is assumed to be SUM_L(picture 74), SUM_L(picture 75), SUM_L(picture 76). The summation of the respective luminance values of each field, SUM_L( ), can be calculated based on the formula below.

$$\mathrm{SUM\_L}() = \sum_{x=1}^{W} \sum_{y=1}^{H} (\text{Luminance value}(x, y))$$

Where W represents the horizontal size and H represents the vertical size of a picture.

The correlation degree calculating unit 62 is an example of "a correlation degree calculating unit configured to calculate, based on the feature amount extracted by the feature amount extracting unit, a correlation degree indicating a degree of image similarity between the current picture and the picture having a specific relationship with the current picture", "the correlation degree calculating unit configured to calculate two correlation degrees which are the respective degrees of image similarity between one of the fields which belong to the current frame and each of the two other fields, from among the respective fields whose feature amount has been extracted, the correlation degree having a lower value as the degree of image similarity increases", "the correlation degree calculating unit configured to calculate a first correlation degree and a second correlation degree, the first correlation degree being a correlation degree between the first field of the current frame and the second field of the frame coded immediately ahead of the current frame, and the second correlation degree being a correlation degree between the first field of the current frame and the second field of the current frame" and "the correlation degree calculating unit configured to calculate, as the two correlation degrees, differences between the respective summations of luminance values of the corresponding fields or absolute values of the differences between the respective summations of luminance values of the corresponding fields". The correlation degree calculating unit 62 calculates the degree of correlation between fields, using the field luminance value summations (SUM_L(picture 74), SUM_L(picture 75), SUM_L(picture 76)) calculated by the picture feature amount extracting unit 61. Here, a correlation degree A between the second field (picture 74) of the frame coded nearest the current picture to be coded and the first field (picture 75) of the current picture to be coded; and a correlation degree B between the first field (picture 75) and the second field (picture 76) of the current picture to be coded, are calculated. The absolute value of the difference between summations of luminance values is used as the value for measuring the degree of correlation.

$$\text{Correlation degree } A = |SUM\_L(\text{picture } 74) - SUM\_L(\text{picture } 75)|$$

$$\text{Correlation degree } B = |SUM\_L(\text{picture } 75) - SUM\_L(\text{picture } 76)|$$

These degrees of correlation A and B represent the amount of image difference between the pictures; and it is judged that the smaller the value, the stronger the correlation between the two pictures, and the bigger the value, the weaker the correlation.

Next, the picture type determining unit 63 is an example of "a picture type determining unit configured to adaptively determine, depending on the correlation degree, a picture type for the current picture, from picture types on which the second inter-prediction is performed and of which there are two types including a picture that can be referred to by another picture, and a picture that cannot be referred to by another picture", "the picture type determining unit configured: to determine the picture type of the current frame to be a Br-picture that can be referred to by another picture, in the case where, between the two correlation degrees, the correlation degree between the fields which belong to the same frame is lower than the degree of correlation between the fields which belong to the different frames; and to determine the picture type of the current frame to be a B-picture which cannot be referred to by another picture, in all other cases", "the picture type determining unit configured to compare the first correlation degree and the second correlation degree calculated by the correlation degree calculating unit, and to determine the picture type for the current frame to be the Br-picture in the case where the comparison shows that the second correlation degree is lower than the first correlation degree", "the picture type determining unit configured to calculate a difference or a ratio between the two correlation degrees calculated by the correlation degree calculating unit, to compare a result of the calculation with a predetermined threshold, and to determine the picture type for the current frame to be the Br-picture in the case where the comparison shows that the correlation degree between the fields which belong to the same frame is lower than the correlation degree between the fields which belong to the different frames" and "the picture type determining unit configured to determine the picture type of a second of two B-pictures to be either a Br-picture or a B-picture, depending on the calculated correlation degree, the two B-pictures appearing between an I-picture and a P-picture or between two P-pictures, in display order". The picture type determining unit 63 determines the coding picture type of picture 75 and picture 76, using the correlation degree A and the correlation degree B. When the correlation degree A is lower than the correlation degree B, the coding picture type of picture 75 and picture 76 is determined to be the B-picture. Inversely, when the correlation degree B is lower than the correlation degree A, the coding picture type of picture 75 and picture 76 is determined to be the Br-picture. This is because the correlation degree A represents the degree of correlation between the second field of the second frame and the first field of the third frame and, when the correlation degree A is small, the coding efficiency for a B-field referring to a Br-field which is the immediately preceding second frame is higher. Furthermore, this is because the correlation degree B represents the degree of correlation between the first field and the second field of the third frame and, when the correlation degree B is small, the coding efficiency for a Br-field referring to the other of the field pair in the same frame is higher.

$$\text{Coding picture type} = B - \text{picture When (correlation degree } A <= \text{correlation degree } B)$$
$$= Br \text{ picture For all other cases}$$

Stated differently, when the correlation between picture 74 and picture 75 is stronger than the correlation between picture 75 and picture 76, coding is performed with the B-picture and, in the opposite case, coding is performed with the Br-picture.

For example, in the field allocation in the 2-3 pull down shown in (a) and (b) in FIG. 7, picture 75 and picture 76 are pictures in the same film-frame, and picture 74 and picture 75 are pictures in different film-frames. Therefore, since the correlation degree B which is the degree of correlation between picture 75 and picture 76 is expected to be equal to or lower than the correlation degree A which is the degree of correlation between picture 74 and picture 75, coding is performed by determining the Br-picture as the picture type for the third frame.

Furthermore, in the field allocation in the 2-3 pull down shown in (a) and (b) in FIG. 8, picture 75 and picture 76 are pictures in the same film-frame, and picture 74 and picture 75 are pictures in different film-frames. Therefore, since the correlation degree B which is the degree of correlation between picture 75 and picture 76 will be equal to or lower than the correlation degree A which is the degree of correlation between picture 74 and picture 75, coding is performed by assuming the Br-picture as the picture type for the third frame.

Furthermore, in the field allocation in the 2-3 pull down shown in (a) and (b) in FIG. 9, picture 74, picture 75 and picture 76 are all pictures in the same film-frame. Therefore, since the correlation degree B, which is the degree of correlation between picture 75 and picture 76, and the correlation degree A, which is the degree of correlation between picture 74 and picture 75, will have the same value, coding is performed by assuming the B-picture as the picture type for the third frame.

In addition, in the field allocation in the 2-3 pull down shown in (a) and (b) in FIG. 10, picture 74 and picture 75 are pictures in the same film-frame, and picture 75 and picture 76 are pictures in different film-frames. Therefore, since the correlation degree B which is the degree of correlation between picture 75 and picture 76 will be higher than the correlation degree A which is the degree of correlation between picture 74 and picture 75, coding is performed by assuming the B-picture as the picture type for the third frame.

Furthermore, in the field allocation in the 2-3 pull down shown in (a) and (b) in FIG. 11, picture 74 and picture 75 are pictures in the same film-frame, and picture 75 and picture 76 are pictures in different film-frames. Therefore, since the correlation degree B which is the degree of correlation between picture 75 and picture 76 will be higher than the correlation degree A which is the degree of correlation between picture 74 and picture 75, coding is performed by assuming the B-picture as the picture type for the third frame.

Here, in order that the determination of the picture type does not change due to slight differences in the correlation degrees, determination for whether or not to assume the B-picture as the picture type may be performed by using a threshold, and comparing the difference between the correlation degree A and the correlation degree B with the threshold.

$$\text{Coding picture type} = B-\text{picture When ((correlation degree } B-$$
$$\text{correlation degree } A) >= \text{threshold})$$
$$= Br \text{ picture For all other cases}$$

In addition, the coding unit 64 is an example of "a coding unit configured to code the current picture according to the determined picture type". The coding unit 64 codes picture 75 and picture 76 using an H.264-compliant method, according to the picture type determined by the picture type determining unit 63.

By performing coding by selecting whether to assume the Br-picture or the B-picture as the picture type, using the correlation degrees in the aforementioned manner, it becomes possible to select an optimal reference picture for each picture, and thus coding efficiency can be improved.

(Second Embodiment)

The configuration of the picture coding apparatus according to a second embodiment is the same as in the first embodiment. However, since the point of calculating the summation of absolute values of the difference between each pixel as the degree of correlation in the second embodiment is different from the first embodiment, the operations of the picture feature amount extracting unit 61 and the correlation degree calculating unit 62 are different.

The picture feature amount extracting unit 61 is an example of "the feature amount extraction unit configured to extract, as the respective feature amounts of the second field of the frame coded immediately ahead of the current frame, the first field of the current frame, and the second field of the current frame, a luminance value of each pixel within each of the fields". The picture feature amount extracting unit 61 extracts the luminance value of the picture on a per-pixel basis. The correlation degree calculation unit 62 is an example of "the correlation degree calculating unit is configured to calculate, as the two correlation degrees, summations of respective differences between the luminance values of co-located pixels in the corresponding fields, or summations of absolute values of the differences between the luminance values of co-located pixels in the corresponding fields". The correlation degree calculation unit 62 calculates the summations of the absolute values of differences for the corresponding pixels as the value for measuring the degree of correlation.

$$\text{Correlation degree } A = \sum_x^W \sum_y^H |\text{Luminance value of picture } 74(x, y) -$$
$$\text{luminance value of picture } 75(x, y)|$$

$$\text{Correlation degree } B = \sum_x^W \sum_y^H |\text{Luminance value of picture } 75(x, y) -$$
$$\text{luminance value of picture } 76(x, y)|$$

By using the summation of absolute values of the difference for each pixel in order to express the degree of correlation, a change in the images between pictures is reflected in the degree of correlation, and thus the accuracy of the degree of correlation improves.

It should be noted that, even with the second embodiment, in order that the determination of the picture type does not change due to slight differences in the correlation degrees, determination for whether or not to assume the B-picture as the picture type may be performed by comparing the difference between the correlation degree A and the correlation degree B with a threshold (Third Embodiment)

The configuration of the picture coding apparatus according to a second embodiment is the same as in the first and second embodiments. However, the relationship between the fields of which correlation is to be calculated by the correlation degree calculating unit 62 and the picture type determining unit 63 is different.

Figure 14:
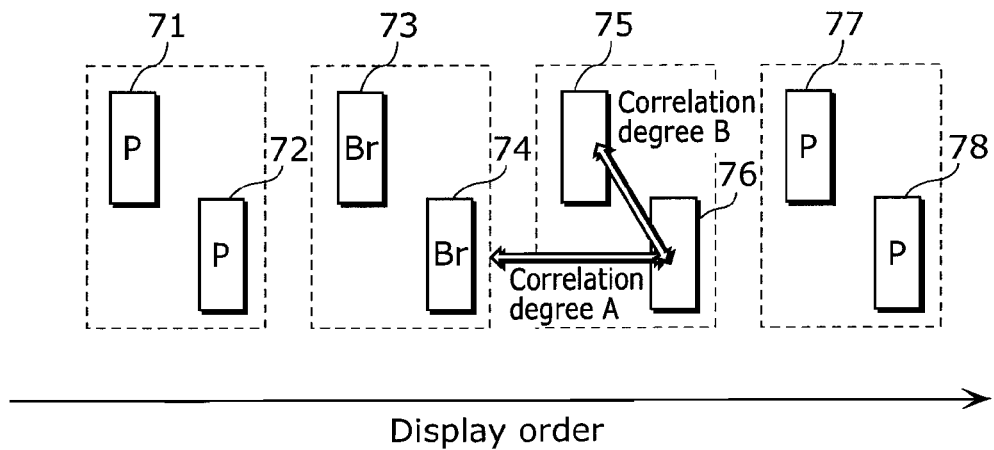
FIG. 14 is a diagram showing another example of a comparison pattern in the case of comparing the degree of correlation between pictures in order to determine the picture type for picture 75 and picture 76 shown in FIG. 12.

FIG. 14 is a diagram showing another example of a comparison pattern in the case of comparing the degree of correlation between pictures in order to determine the picture type for picture 75 and picture 76 shown in FIG. 12. The correlation degree calculating unit 62 is an example of "the correlation degree calculating unit configured to calculate a third correlation degree and a fourth correlation degree, the third correlation degree being a correlation degree between the second field of the current frame and the second field of the frame coded immediately ahead of the current frame, and the fourth correlation degree being a correlation degree between the second field of the current frame and the first field of the current frame". The correlation degree calculating unit 62 calculates the correlation degree A between the second field (picture 74) of the frame coded nearest the current frame to be coded (the second frame in FIG. 14) and the second field (picture 76) of the current frame to be coded; and a correlation degree B between the first field (picture 75) and the second field (picture 76) of the current frame to be coded.

The picture type determining unit 63 is an example of "the picture type determining unit configured to compare the third correlation degree and the fourth correlation degree calculated by the correlation degree calculating unit, and to determine the picture type for the current frame to be the Br-picture in the case where the comparison shows that the fourth correlation degree is lower than the third correlation degree". The picture type determining unit 63 determines the coding picture type of picture 75 and picture 76 to be the B-picture in the case where the correlation degree A is lower than the correlation degree B. Inversely, when the correlation degree B is lower than the correlation degree A, the picture type determining unit 63 determines the coding picture type of picture 75 and picture 76 to be the Br-picture.

It should be noted that the method for calculating the correlation degree A and the correlation degree B may be the method described in the first embodiment, and may also be the method described in the second embodiment.

(Fourth Embodiment)

The configuration of the picture coding apparatus according to a fourth embodiment is the same as in the first, second, and third embodiments. However, the picture type judgment formula of the picture type determining unit 63 is different.

The picture type determining unit 63 is an example of "the picture type determining unit configured to calculate a difference or a ratio between the two correlation degrees calculated by the correlation degree calculating unit, to compare a result of the calculation with a predetermined threshold, and to determine the picture type for the current frame to be the Br-picture in the case where the comparison shows that the correlation degree between the fields which belong to the same frame is lower than the correlation degree between the fields which belong to the different frames". The picture type determining unit 63 determines the picture type by using the ratio between the correlation degree A and the correlation degree B. When the ratio between the correlation degree A and the correlation degree B is lower than a threshold, the picture type determining unit 63 determines the coding picture type of picture 75 and picture 76 to be the B-picture. Inversely, when the ratio between the correlation degree A and the correlation degree B is higher than the threshold, the picture type determining unit 63 determines the coding picture type of picture 75 and picture 76 to be the Br-picture Note that the threshold is assumed to be a value equal to or greater than 1. Furthermore, in the following formula, aside from multiplying the threshold to the correlation degree B, an offset may also be added.

$$\text{Coding picture type} = B-\text{picture When (correlation degree } A <= \text{correlation degree } B \times \text{threshold)}$$

$$= Br \text{ picture For all other cases}$$

As described above, according to the first to fourth embodiments, whether the field pair included in the second B-frame of two B-frames sandwiched by two I- or P-frames should be B-pictures or Br-pictures can be selected adaptively and using various methods, according to the degree of correlation between the pictures, and thus it is possible to select the optimal reference picture and improve coding efficiency.

It should be noted that, although the first to fourth embodiments are described using, as an example, the case where the first field is coded ahead of the second field in the coding according to the interlaced method, the above-described picture type determining method can be applied even when the second field is coded ahead of the first field.

Furthermore, although the judgment for assuming either the B-picture or the Br-picture is performed only for the second B-frame of the two consecutive B-frames in the first to fourth embodiments, the present invention is not limited to such, and the above-described judgment may be performed, and the picture type determined even for the first Br-picture.

It should be noted that the first to fourth embodiments may be used in any combination with each other.

Note that each function block in the block diagrams (FIG. 6 and so on) is typically implemented as an LSI which is an integrated circuit. These functions blocks may be individually configured as single chips or may be configured so that a part or all of the function blocks are included in a single chip. For example, function blocks other than a memory may be configured as a single chip.

Although an LSI is mentioned here, the integrated circuit can also be called an IC, a system LSI, a super LSI, and an ultra LSI, depending on differences in integration.

Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

Furthermore, from among the respective function blocks, a separate configuration may be adopted for the unit which stores data to be coded or decoded, without it being configured as a single chip.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention can be applied to a picture coding apparatus and a picture coding method, and particularly to a personal computer and a Personal Digital Assistant (PDA) having a communication function, a mobile phone, and a broadcast station for digital broadcasts.

What is claimed is:

1. A picture coding apparatus which codes a current picture to be coded using at least bi-directional prediction for two fields making up an inputted frame, the picture coding apparatus comprising:
a correlation degree calculating unit configured to calculate (i) a first correlation degree indicating a correlation between a first field of an inputted first frame and a second field of the first frame, and (ii) a second correlation degree indicating a correlation between the first field and a field of a coded frame adjacent to the first frame;
a picture type determining unit configured to limit pictures that are referred to when a picture is coded using bi-directional prediction, by determining one of (i) a first bi-directional prediction picture type whose picture is coded using bi-directional prediction and is not a reference picture of another picture, and (ii) a second bi-directional prediction picture type whose picture is coded using bi-directional prediction and is a reference picture of another picture, as a picture type of the first field or the second field, based on the first correlation degree and the second correlation degree, in the case of performing bi-directional prediction for the first frame; and
a coding unit configured to code the first field or the second field according to the determined picture type;
wherein the correlation degree calculating unit is configured to calculate the first correlation degree and the second correlation degree based on a luminance value of the first field, a luminance value of the second field, and a luminance value of the field of the coded frame adjacent to the first frame.

2. The picture coding apparatus according to claim 1, wherein the picture type determining unit is configured to determine the second bi-directional prediction picture type as the picture type of the first field or the second field, when the first correlation degree is higher than the second correlation degree.

3. The picture coding apparatus according to claim 2,
wherein the picture type determining unit is configured to calculate a ratio between the first correlation degree and the second correlation degree, and to determine the picture type of the first field or the second field based on the ratio.

4. The picture coding apparatus according to claim 1,
wherein the picture type determining unit is configured to determine the first bi-directional prediction picture type as the picture type of the first field or the second field, when the first correlation degree is lower than the second correlation degree.

5. The picture coding apparatus according to claim 4,
wherein the picture type determining unit is configured to calculate a ratio between the first correlation degree and the second correlation degree, and to determine the picture type of the first field or the second field based on the ratio.

6. The picture coding apparatus according to claim 1,
wherein the picture type determining unit is configured to calculate a ratio between the first correlation degree and the second correlation degree, and to determine the picture type of the first field or the second field based on the ratio.

7. The picture coding apparatus according to claim 1,
wherein the picture type determining unit is configured to determine the picture type of the first field or the second field of the first frame which is a second frame included in two frames located, in display order, (i) between an intra-prediction frame and a forward-prediction frame or (ii) between forward-prediction frames.

8. A picture coding method which codes a current picture to be coded, using at least bi-directional prediction for two fields making up an inputted frame, the picture coding method comprising:

Calculating, using correlation degree calculation unit, implemented as large scale integrate (LSI) circuit, (i) a first correlation degree indicating a correlation between a first field of an inputted first frame and a second field of the first frame, and (ii) a second correlation degree indicating a correlation between the first field and a field of a coded frame adjacent to the first frame;

limiting, based on the first correlation degree and the second correlation degree, pictures that are referred to when a picture is coded using bi-directional prediction, by determining one of (i) a first bi-directional prediction picture type whose picture is coded using bi-directional prediction and is not a reference picture of another picture, and (ii) a second bi-directional prediction picture type whose picture is coded using bi-directional prediction and is a reference picture of another picture, as a picture type of the first field or the second field, in the case of performing bi-directional prediction for the first frame; and coding the first field or the second field according to the determined picture type;

wherein the first correlation degree and the second correlation degree are calculated based on a luminance value of the first field, a luminance value of the second field, and a luminance value of the field of the coded frame adjacent to the first frame.

* * * * *